US012122147B2

(12) United States Patent
Takizawa et al.

(10) Patent No.: US 12,122,147 B2
(45) Date of Patent: Oct. 22, 2024

(54) PRINTING SYSTEM AND PROCESS MANAGEMENT DEVICE

(71) Applicant: MIMAKI ENGINEERING CO., LTD., Nagano (JP)

(72) Inventors: Tomohiko Takizawa, Nagano (JP); Shunsuke Akuta, Nagano (JP); Tsukasa Takeda, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 134 days.

(21) Appl. No.: 17/908,240

(22) PCT Filed: Feb. 3, 2021

(86) PCT No.: PCT/JP2021/003972
§ 371 (c)(1),
(2) Date: Aug. 31, 2022

(87) PCT Pub. No.: WO2021/176938
PCT Pub. Date: Sep. 10, 2021

(65) Prior Publication Data
US 2023/0121680 A1     Apr. 20, 2023

(30) Foreign Application Priority Data

Mar. 2, 2020   (JP) ................................ 2020-034611

(51) Int. Cl.
*B41J 11/00* (2006.01)
*B05D 7/24* (2006.01)
(Continued)

(52) U.S. Cl.
CPC ............. *B41J 11/0015* (2013.01); *B05D 7/24* (2013.01); *B41J 3/4078* (2013.01);
(Continued)

(58) Field of Classification Search
CPC ............................ B41J 11/0015; B41J 3/4078
See application file for complete search history.

(56) References Cited

U.S. PATENT DOCUMENTS 9,751,312 B1 * 9/2017 Valancy ............... B41J 2/16508
2008/0239042 A1 10/2008 Gauss et al.
(Continued)

FOREIGN PATENT DOCUMENTS

| JP | 2002169608 | 6/2002 |
|---|---|---|
| JP | 2015074110 | 4/2015 |
| JP | 2019006073 | 1/2019 |

OTHER PUBLICATIONS

"International Search Report (Form PCT/ISA/210) of PCT/JP2021/003972," mailed on May 11, 2021, with English translation thereof, pp. 1-4.

(Continued)

*Primary Examiner* — Jason S Uhlenhake
(74) *Attorney, Agent, or Firm* — JCIPRNET

(57) ABSTRACT

A printing system 10 configured to generate a product of printing includes: a coater 14 that is a pretreatment machine configured to execute a pretreatment process of performing a predetermined pretreatment on a medium that is a target of the printing; a printer 16 that is a printing device configured to execute a print process of performing the printing by ejecting ink onto the medium after the pretreatment performed by the coater 14; and a controller 12 that is a process management device configured to propose a condition for the pretreatment process based on a condition for the product to be generated.

14 Claims, 8 Drawing Sheets

(51) Int. Cl.
*B41J 3/407* (2006.01)
*G05B 19/042* (2006.01)
*G06Q 50/04* (2012.01)

(52) U.S. Cl.
CPC .......... *G05B 19/042* (2013.01); *G06Q 50/04* (2013.01); *G05B 2219/2646* (2013.01)

(56) References Cited

U.S. PATENT DOCUMENTS

| | | | | |
|---|---|---|---|---|
| 2009/0293209 | A1* | 12/2009 | Chung | D06P 1/6491 8/445 |
| 2013/0293617 | A1* | 11/2013 | Suzuki | B41J 11/0015 347/16 |
| 2019/0217632 | A1* | 7/2019 | Friedrich | B41J 2/01 |
| 2019/0303734 | A1* | 10/2019 | Tamaki | B41J 3/4078 |

OTHER PUBLICATIONS

"Search Report of Europe Counterpart Application", issued on Jul. 10, 2023, p. 1-p. 12.

\* cited by examiner

[Library]

Information 1   Agent A 1%, Agent B 5%, Agent C 5%, Agent D 2%, water 87%
                Performance A ±0, Performance B ±0, Performance C ±0, Performance D ±0

Information 2   Agent A 2%, Agent B 5%, Agent C 5%, Agent D 2%, water 86%
                Performance A +1, Performance B +1, Performance C -1, Performance D ±0

Information 3   Agent A 2%, Agent B 8%, Agent C 8%, Agent D 2%, water 80%
                Performance A +1, Performance B +1, Performance C ±0, Performance D -1

Information 4   Agent A 1%, Agent B 3%, Agent C 3%, Agent D 1%, water 92%
                Performance A -1, Performance B ±0, Performance C -1, Performance D +1

Information 5   Agent A 1%, Agent B 5%, Agent C 8%, Agent D 2%, water 84%
                Performance A +1, Performance B ±0, Performance C ±0, Performance D -1

· · · · ·

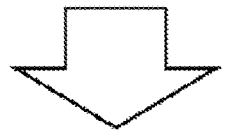

[Library search results/candidates]

(1) Information 3   Agent A 2%, Agent B 8%, Agent C 8%, Agent D 2%, water 80%
                    Performance A +1, Performance B +1, Performance C ±0, Performance D -1

(2) Information 5   Agent A 1%, Agent B 5%, Agent C 8%, Agent D 2%, water 84%
                    Performance A +1, Performance B ±0, Performance C ±0, Performance D -1

× · · · ·

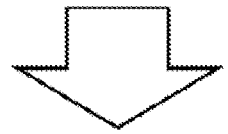 Select optimum information

[Selected information]

Information 3   Agent A 2%, Agent B 8%, Agent C 8%, Agent D 2%, water 80%
                Performance A +1, Performance B +1, Performance C ±1, Performance D -1

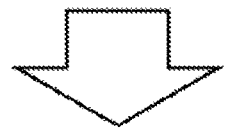

Reflect selected information

FIG. 2

|  |  | #1 | #2 | #3 | #4 | #5 | #6 | #7 | #8 | #9 | #10 | #11 | #12 | #13 |
|---|---|---|---|---|---|---|---|---|---|---|---|---|---|---|
| Pretreatment agent composition | Sodium alginate. | 0.5 | 0.0 | 0.3 | 0.7 | 1.0 | 0.5 | 0.5 | 0.5 | 0.5 | 0.5 | 0.5 | 0.5 | 0.5 |
|  | CMC | 1.0 | 1.0 | 1.0 | 1.0 | 1.0 | 0.0 | 0.5 | 1.5 | 2.0 | 1.0 | 1.0 | 1.0 | 1.0 |
|  | Sodium hydrogen carbonate | 6.0 | 6.0 | 6.0 | 6.0 | 6.0 | 0.0 | 6.0 | 6.0 | 6.0 | 0.0 | 3.0 | 9.0 | 12.0 |
|  | Anhydrous sodium sulphate | 4.0 | 4.0 | 4.0 | 4.0 | 4.0 | 4.0 | 4.0 | 4.0 | 4.0 | 4.0 | 4.0 | 4.0 | 4.0 |
|  | Urea | 4.0 | 4.0 | 4.0 | 4.0 | 4.0 | 4.0 | 4.0 | 4.0 | 4.0 | 4.0 | 4.0 | 4.0 | 4.0 |
|  | Sodium metanitrobenzene sulphonate | 1.0 | 1.0 | 1.0 | 1.0 | 1.0 | 1.0 | 1.0 | 1.0 | 1.0 | 1.0 | 1.0 | 1.0 | 1.0 |
|  | Sodium hexametaphosphate | 1.0 | 1.0 | 1.0 | 1.0 | 1.0 | 1.0 | 1.0 | 1.0 | 1.0 | 1.0 | 1.0 | 1.0 | 1.0 |
|  | Water | 82.5 | 83.0 | 82.7 | 82.3 | 82.0 | 83.5 | 83.0 | 82.0 | 81.5 | 88.5 | 85.5 | 79.5 | 76.5 |
| Workability | Viscosity [mPa·s] (25° C) | 73.4 | 19.6 | 40.0 | 104.7 | 141.3 | 14.0 | 31.3 | 132.9 | 174.7 | 66.3 | 63.5 | 65.1 | 70.4 |
|  | pH(25°C) | 8.9 | 8.7 | 9.0 | 9.1 | 9.0 | 8.8 | 8.8 | 8.8 | 8.8 | 6.0 | 9.5 | 9.5 | 9.4 |
|  | Whether agent completely dissolves | ○ | ○ | ○ | ○ | ○ | ○ | ○ | ○ | ○ | ○ | ○ |  |  |
| Cost | Unit price of pretreatment agent [jpy/kg] | 68.9 | 53.9 | 62.9 | 74.9 | 83.9 | 50.4 | 59.7 | 78.2 | 87.4 | 61.4 | 65.2 | 72.7 | 76.4 |
| Performance (in scale of 1 to 5) | Front surface concentration — Black | 3 | 3 | 3 | 3 | 3 | 3 | 3 | 3 | 3 | 1 | 3 | 3 | 3 |
|  | Cyan | 3 | 3 | 3 | 3 | 3 | 2 | 2 | 3 | 3 | 1 | 3 | 2 | 3 |
|  | Magenta | 3 | 3 | 3 | 3 | 3 | 3 | 3 | 3 | 3 | 1 | 3 | 3 | 4 |
|  | Yellow | 3 | 3 | 3 | 3 | 3 | 4 | 3 | 4 | 4 | 1 | 3 | 3 | 4 |
|  | Back surface concentration — Black | 3 | 3 | 3 | 3 | 3 | 3 | 3 | 4 | 3 | 5 | 3 | 3 | 3 |
|  | Cyan | 3 | 3 | 3 | 4 | 3 | 4 | 4 | 4 | 4 | 5 | 3 | 3 | 3 |
|  | Magenta | 3 | 3 | 3 | 4 | 3 | 4 | 4 | 4 | 3 | 5 | 4 | 4 | 2 |
|  | Yellow | 3 | 3 | 3 | 3 | 3 | 3 | 3 | 3 | 3 | 1 | 3 | 3 | 3 |
|  | Hue (size of gamut range) | 3 | 3 | 3 | 3 | 3 | 2 | 2 | 2 | 2 | 1 | 2 | 2 | 2 |
|  | Smearing | 3 | 2 | 2 | 3 | 3 | 2 | 2 | 2 | 2 | 1 | 2 | 2 | 2 |

FIG. 3

| Categories | | |
|---|---|---|
| Major categories | Intermediate categories | Minor categories |
| Sizing agent | Natural paste | Sodium alginate<br>Meypro gum<br>Guar gum<br>Glue<br>Bentonite |
| | Processed paste | British gum<br>Dextrin<br>Hydroxyethyl starch<br>Carboxymethyl starch<br>Ester phosphate starch |
| | Semi-synthetic paste | Methylcellulose<br>Ethylcellulose<br>Hydroxy ethylcellulose<br>Carboxy methylcellulose<br>Acetylcellulose |
| | Synthetic paste | Polyvinyl alcohol<br>Polyvinyl acetate<br>Polyacrylic acid |
| pH regulator | | Sodium hydrogen carbonate<br>Sodium carbonate<br>Sodium hydroxide<br>Ammonium tartrate<br>Ammonium sulphate<br>Citric acid |
| Stimulant | | Sodium sulphate<br>Sodium chloride |
| Water retention agent | | Urea |
| Dark dye<br>Chelating agent | | Sun flowren SN (Nicca chemical Co., Ltd.)<br>Sodium hexametaphosphate<br>EDTA·2Na<br>EDTA·4Na |
| Anti-reduction agent | | Sodium metanitrobenzene sulphonate |

FIG. 4

| Classification | Categories | | | Varying parameter |
|---|---|---|---|---|
| | Major categories | Intermediate categories | Minor categories | |
| Process | Entirety | Time required for entirety | | Time |
| | | Cost required for entirety | | Cost |
| | | Safety of entirety | | Safety |
| | Pretreatment process | Pretreatment agent | Blending time | Time |
| | | | Dissolving time | Time |
| | | | Viscosity | Time, safety |
| | | | pH | Safety |
| | | | Material cost | Cost |
| | | | Work hour | Cost, time |
| | | Device condition | Drying temperature | Cost |
| | | | Conveyance hour | Time, cost |
| | | | Pickup ratio (drawing ratio) | Cost |
| | Print process | Ink | Print amount | Cost |
| | | Device condition | Drying speed | Time |
| | | | Work hour | Cost, time |
| | Steaming process | Device condition | Conveyance hour | Time, cost |
| | | | In-steamer temperature | Cost |
| | | | Steam amount | Cost |
| | | | Work hour | Cost, time |
| | Washing process | Device condition | Conveyance hour | Time, cost |
| | | | Number of baths | Cost, time |
| | | | Bath temperature | Cost, time |
| | | | Frequency/amount of (hot) water exchange | Cost, time |
| | | | Agent concentration | Cost |
| | | | Work hour | Cost, time |
| | | | Bath contaminant threshold (maximum contaminant concentration not resulting in poor reservation of fabric white area) | Cost, time |
| Product performance | | | | Printed surface reflection concentration |
| | | | | Printed surface hue (size of gamut range) |
| | | | | Back surface reflection concentration |
| | | | | Back surface hue (size of gamut range) |
| | | | | Image quality (unlikeliness of smearing) |
| | | | | Robustness |
| | | | | Texture |

FIG. 5

| Material name | Blending ratio | Cost | | Safety | | | |
|---|---|---|---|---|---|---|---|
| | | Unit price | CAS No. | RoHS | REACH - SVHC | | GHS category |
| Sodium alginate | a wt% | A JPY/kg | 9005-38-3 | N/A | N/A | Not applied | |
| CMC | b wt% | B JPY/kg | 9004-32-4 | N/A | N/A | Not applied | |
| Sodium hydrogen carbonate | c wt% | C JPY/kg | 144-55-8 | N/A | N/A | Not applied | |
| Anhydrous sodium sulphate | d wt% | D JPY/kg | 7757-82-6 | N/A | N/A | Not applied | |
| Urea | e wt% | E JPY/kg | 57-13-6 | N/A | N/A | Skin corrosivity/irritation: class 2<br>Severe damage to eyes/eye irritation: class 2A | |
| Sodium metanitrobenzene sulphonate | f wt% | F JPY/kg | 127-68-4 | N/A | N/A | Severe damage to eyes/eye irritation: class 2<br>Skin sensitization: class 1 | |
| Sodium hexametaphosphate | g wt% | G JPY/kg | 10124-56-8 | N/A | N/A | Not applied | |
| Water | h wt% | | 7732-18-5 | N/A | N/A | Not applied | |
| Pretreatment agent as a whole | 100wt% | H JPY/kg | | | | Skin sensitization: class 1 | |

FIG. 6

[Library]

Information 1   Agent A 0.1% o.w.f., Agent B 0.5% o.w.f., Agent C 0.5% o.w.f.,
                Performance A ±0, Performance B ±0, Performance C ±0, Performance D ±0

Information 2   Agent A 0.2% o.w.f., Agent B 0.5% o.w.f., Agent C 0.5% o.w.f.,
                Performance A +1, Performance B +1, Performance C -1, Performance D ±0

Information 3   Agent A 0.1% o.w.f., Agent B 0.8% o.w.f., Agent C 0.8% o.w.f.,
                Performance A +1, Performance B +1, Performance C ±0, Performance D -1

Information 4   Agent A 0.1% o.w.f., Agent B 0.3% o.w.f., Agent C 0.3% o.w.f.,
                Performance A -1, Performance B ±0, Performance C -1, Performance D +1

Information 5   Agent A 0.1% o.w.f., Agent B 0.5% o.w.f., Agent C 0.8% o.w.f.,
                Performance A +1, Performance B ±0, Performance C ±0, Performance D -1

· · · · ·

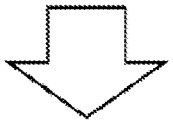

[Library search results/candidates]

(1) Information 3
    Agent A 0.1% o.w.f., Agent B 0.8% o.w.f., Agent C 0.8% o.w.f.,
    Performance A +1, Performance B +1, Performance C ±0, Performance D -1

(2) Information 5
    Agent A 0.1% o.w.f., Agent B 0.5% o.w.f., Agent C 0.8% o.w.f.,
    Performance A +1, Performance B ±0, Performance C ±0, Performance D -1

· · · · ·

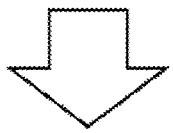   Select optimum information

[Selected information]

Information 3
    Agent A 0.1% o.w.f., Agent B 0.8% o.w.f., Agent C 0.8% o.w.f.,
    Performance A +1, Performance B +1, Performance C ±0, Performance D -1

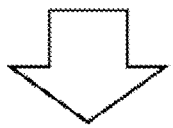

Reflect selected information

FIG. 7

| | | #1 | #2 | #3 | #4 | #5 | #6 | #7 | #8 | #9 | #10 | #11 | #12 | #13 |
|---|---|---|---|---|---|---|---|---|---|---|---|---|---|---|
| Substance weight ratio [%o.w.f.] | Sodium alginate | 0.4 | 0.0 | 0.2 | 0.6 | 0.8 | 0.4 | 0.4 | 0.4 | 0.4 | 0.4 | 0.4 | 0.4 | 0.4 |
| | CMC | 0.8 | 0.8 | 0.8 | 0.8 | 0.8 | 0.4 | 0.4 | 1.2 | 1.6 | 0.8 | 0.8 | 0.8 | 0.8 |
| | Sodium hydrogen carbonate | 4.8 | 4.8 | 4.8 | 4.8 | 4.8 | 0.0 | 4.8 | 4.8 | 4.8 | 0.0 | 2.4 | 7.2 | 9.6 |
| | Anhydrous sodium sulphate | 3.2 | 3.2 | 3.2 | 3.2 | 3.2 | 3.2 | 3.2 | 3.2 | 3.2 | 3.2 | 3.2 | 3.2 | 3.2 |
| | Urea | 3.2 | 3.2 | 3.2 | 3.2 | 3.2 | 3.2 | 3.2 | 3.2 | 3.2 | 3.2 | 3.2 | 3.2 | 3.2 |
| | Sodium metanitrobenzene sulphonate | 0.8 | 0.8 | 0.8 | 0.8 | 0.8 | 0.8 | 0.8 | 0.8 | 0.8 | 0.8 | 0.8 | 0.8 | 0.8 |
| | Sodium hexametaphosphate | 0.8 | 0.8 | 0.8 | 0.8 | 0.8 | 0.8 | 0.8 | 0.8 | 0.8 | 0.8 | 0.8 | 0.8 | 0.8 |
| Workability | Viscosity [mPa·s] (25° C) | 73.4 | 19.6 | 40.0 | 104.7 | 141.3 | 14.0 | 31.3 | 132.9 | 174.7 | 66.3 | 63.5 | 65.1 | 70.4 |
| | pH (25°C) | 8.9 | 8.7 | 9.0 | 9.1 | 9.0 | 8.8 | 8.8 | 8.8 | 8.8 | 6.0 | 9.5 | 9.5 | 9.4 |
| | Whether agent completely dissolves | O | O | O | O | O | O | O | O | O | O | O | | |
| Cost | Unit price of pretreatment agent [jpy/kg] | 68.9 | 53.9 | 62.9 | 74.9 | 83.9 | 50.4 | 59.7 | 78.2 | 87.4 | 61.4 | 65.2 | 72.7 | 76.4 |
| Performance (in scale of 1 to 5) | Front surface concentration Black | 3 | 3 | 3 | 3 | 3 | 3 | 3 | 3 | 3 | 1 | 3 | 3 | 3 |
| | Front surface concentration Cyan | 3 | 3 | 3 | 3 | 3 | 2 | 2 | 3 | 3 | 1 | 3 | 2 | 3 |
| | Front surface concentration Magenta | 3 | 3 | 3 | 3 | 3 | 3 | 3 | 3 | 3 | 1 | 3 | 3 | 4 |
| | Front surface concentration Yellow | 3 | 3 | 3 | 3 | 3 | 4 | 3 | 4 | 4 | 1 | 3 | 3 | 4 |
| | Back surface concentration Black | 3 | 3 | 3 | 3 | 3 | 3 | 3 | 4 | 3 | 5 | 3 | 3 | 3 |
| | Back surface concentration Cyan | 3 | 3 | 3 | 4 | 3 | 4 | 4 | 4 | 4 | 5 | 3 | 3 | 3 |
| | Back surface concentration Magenta | 3 | 3 | 3 | 4 | 3 | 4 | 4 | 4 | 3 | 5 | 3 | 3 | 2 |
| | Back surface concentration Yellow | 3 | 3 | 3 | 3 | 3 | 3 | 3 | 3 | 3 | 1 | 4 | 4 | 4 |
| | Hue (size of gamut range) | 3 | 2 | 2 | 3 | 3 | 2 | 2 | 2 | 2 | 1 | 3 | 3 | 3 |
| | Smearing | 3 | 3 | 3 | 3 | 3 | 3 | 2 | 2 | 3 | 1 | 2 | 2 | 2 |

FIG. 8

PRINTING SYSTEM AND PROCESS MANAGEMENT DEVICE

CROSS-REFERENCE TO RELATED APPLICATION

This application is a 371 application of the International PCT application serial no. PCT/JP2021/003972, filed on Feb. 3, 2021, which claims the priority benefits of Japan Patent Application No. 2020-034611, filed on Mar. 2, 2020. The entirety of each of the above-mentioned patent applications is hereby incorporated by reference herein and made a part of this specification.

TECHNICAL FIELD

The present invention relates to a printing system, a process management device, and a printing method.

BACKGROUND ART

Conventionally, printing devices have been used in various fields. When printing is performed with a printing device, depending on a purpose of the printing and a medium used, a predetermined pretreatment process or the like may be performed on the medium, in addition to the print process performed by the printing device (see, for example, Patent literature 1).

CITATION LIST

Patent Literature

Patent Literature 1: Japanese Unexamined Patent Publication No. 2002-169608

SUMMARY OF INVENTION

Technical Problems

When the pretreatment process or the like is performed in addition to the print process, for example, operations in each of the processes are sequentially performed, based on a production condition designating a condition for each of the processes. More appropriate management on the operations in the processes in this case has been called for. In view of this, the present invention provides a printing system, a process management device, and a printing method that can achieve the task described above.

Solutions to Problems

Regarding the printing system that generates a product with the pretreatment process performed in addition to the print process, the inventors of the present application have made intensive studies on a configuration for more appropriately managing each of the processes. The inventors have first arrived at an idea of collectively managing a plurality of processes including the print process, instead of individually managing each process. With such a configuration, production management is comprehensively performed on a plurality of processes, meaning that each process can be managed more appropriately than in a case where different administrators respectively manage the processes or the like for example. More specifically, the inventors of the present application have arrived at an idea of determining a condition for a predetermined pretreatment process based on a condition for the product (the performance of a printed matter for example) to be generated, in the case where the pretreatment process is performed before the print process. Furthermore, the inventors have arrived at an idea of using, as a configuration for implementing this idea, a process management device proposing the condition for the pretreatment process. With this configuration, for example, the condition for the pretreatment process can be appropriately determined based on the condition for the product to be generated.

Through further intensive studies, the inventors of the present application have found the features required for achieving such an effect, and arrived at the present invention. To achieve the task described above, the present invention provides a printing system configured to generate a product of printing and including: a pretreatment machine that is a device configured to execute a pretreatment process of performing a predetermined pretreatment on a medium that is a target of the printing; a printing device configured to execute a print process of performing the printing by ejecting ink onto the medium after the pretreatment performed by the pretreatment machine; and a process management device configured to propose a condition for the pretreatment process based on a condition for the product to be generated.

With this configuration, for example, the condition for the pretreatment process can be appropriately determined based on the condition for the product to be generated. With this configuration, the pretreatment process can be more appropriately executed for example.

With this configuration, a fabric medium may be used as the medium for example. In this case, as the pretreatment process, a process of coating the medium with a pretreatment agent may be executed for example. As the print process, for example, a process of ejecting ink onto the fabric medium may be executed. With this configuration, the printing can be appropriately performed on the fabric medium for example.

As the pretreatment agent, for example, a pretreatment agent including a plurality of types of substances may be used. In this case, for example, the process management device may propose pretreatment agent blending information that is information indicating a composition of the plurality of types of substances included in the pretreatment agent as at least part of the condition for the pretreatment process, and the like. With this configuration, for example, the composition of the pretreatment agent used in the pretreatment process can be appropriately determined based on the condition for the product to be generated.

For example, in the pretreatment process, the pretreatment machine may be caused to perform the coating with the pretreatment agent, with a parameter designating a device operation or the like designated. In this case, the process management device may propose, as the condition for the pretreatment process, information indicating a value to be designated for such a parameter for example. In this case, for example, the process management device may propose pretreatment device condition information that is information designating an operation of executing, with the pretreatment machine, coating with the pretreatment agent and the like, as at least part of the condition for the pretreatment process. With this configuration, for example, the pretreatment machine can be caused to execute the pretreatment process more appropriately.

In this configuration, for example, based on condition association information that is information in which the condition for the product and the condition for the pretreatment process are associated with each other, the process management device determines the condition for the pretreatment processes to be proposed. With this configuration, for example, the condition for a pretreatment process can be appropriately determined. In this case, the process management device determines the condition for the pretreatment process based on, for example, condition association information stored in a storage unit of the process management device. The process management device may determine the condition for the pretreatment process, based on the condition association information stored in a storage unit or the like of another computer. For example, a library or the like generated in advance with the condition for the product associated with the condition for the pretreatment process may be used as the condition association information.

Furthermore, as the condition for the pretreatment process in the condition association information, the use of information indicating the amount of each substance included in the pretreatment agent to be attached to the medium and the like are also conceivable for example. More specifically, in this case, as the condition for the pretreatment process in the condition association information, for example, a substance weight ratio indicating the weight of each of a plurality of types of substances included in the pretreatment agent to be provided to the medium with respect to the unit weight of the medium is used. With this configuration, for example, it is possible to more reliably designate the amount of each substance, included in the pretreatment agent, to be attached to the medium. This configuration further enables the condition for the pretreatment process to be more appropriately proposed, to suppress the impact or the like due to a difference in how the coating with the pretreatment agent is performed in the pretreatment process and the like for example.

When the substance weight ratio is used as the condition for the pretreatment process, for example, the pretreatment agent blending information may be determined based on a pickup ratio that is a proportion of a weight of the pretreatment agent used for the coating to the weight of the medium. More specifically, in this case, the process management device may propose the pickup ratio and the pretreatment agent blending information, based on the substance weight ratio associated with the condition for the product, as the condition for the pretreatment process in the condition association information for example. With this configuration, for example, the specific composition of the pretreatment agent can be appropriately determined based on the condition association information using the substance weight ratio as the condition for the pretreatment process.

A case is conceivable such as that where the pickup ratio is determined by the designation by the user for example. In this case, the process management device receives the designation of the pickup ratio from the user for example. The pretreatment agent blending information is proposed, based on the substance weight ratio and the pickup ratio associated with the condition for the product, as the condition for the pretreatment process in the condition association information. Also with this configuration, for example, the specific composition of the pretreatment agent can be appropriately determined based on the condition association information using the substance weight ratio as the condition for the pretreatment process.

The printing system of this configuration may further include a subsequent treatment machine for example. In this case, the subsequent treatment machine can be regarded as, for example, a device that executes a subsequent treatment process of performing a predetermined subsequent treatment on the medium after the print process has been performed and the like. Furthermore, in this case, the condition for the product to be generated can be regarded as, for example, a condition indicating a state of the medium after the subsequent treatment process has been performed and the like. With this configuration, for example, the condition for the pretreatment process can be more appropriately determined in a case where the subsequent treatment process is performed. As the subsequent treatment process, for example, a washing process of washing the medium after the ink has been ejected thereonto in the print process may be executed. As the subsequent treatment process, for example, performing a color developing process for color development of the ink used in the print process and the like are conceivable.

The process management device may propose the condition for the pretreatment process in association with a condition other than the condition for the product to be generated. In this case, for example, the condition for the pretreatment process may be associated with a time, cost, or the like required for at least any of the processes executed in the printing system. More specifically, in this case, the process management device proposes the condition for the pretreatment process, in association with a result of estimating a time required for executing at least any of the processes executed on the medium for example. Furthermore, the process management device may propose the condition for the pretreatment process, in association with a result of estimating a cost required for executing at least any of the processes executed on the medium for example. With these configurations, the condition for the pretreatment process can be more appropriately determined while taking various conditions into consideration.

In this configuration, for example, the process management device receives a designation of the condition for the product from the user, and determines the condition for the pretreatment process to be proposed, based on the condition for the product received from the user. With this configuration, for example, the condition for the pretreatment process can be appropriately determined based on the condition for the product desired by the user. In this case, as the condition for the product, a plurality of parameters indicating the performance or the like of the product may be used for example. In this case, for example, the process management device presents a plurality of parameters for the condition for the product or the like to the user. Then, the designation of the condition for the product or the like is received from the user, when an instruction of changing a value of at least any of the plurality of parameters is received from the user for example. Thus, the process management device determines the condition for the pretreatment process to be proposed, based on the condition for the product or the like received from the user for example. With this configuration, for example, the condition for the pretreatment process can be appropriately determined based on the condition for the product to be generated or the like.

The process management device may propose a plurality of the conditions for the pretreatment to the user, for example. In this case, the process management device may propose each of the conditions for the pretreatment process, in association with a state of the product achieved when the condition for the pretreatment process is employed and the like for example. This configuration enables the user to appropriately select the condition for the pretreatment process for generating the product in a desired state for example.

The configuration of the present invention can be implemented with a focus on the use of the substance weight ratio for example. In this case, for example, the present invention can be regarded as a printing system configured to generate a product of printing and including: a pretreatment machine that is a device configured to execute a pretreatment process of performing a pretreatment of coating a fabric medium that is a target of the printing with a pretreatment agent including a plurality of types of substances; a printing device configured to execute a print process of performing the printing by ejecting ink on the medium after the pretreatment has been executed by the pretreatment machine; and a process management device configured to manage a condition for the pretreatment process, in which the process management device manages the condition for the pretreatment process based on a substance weight ratio indicating a weight of each of the plurality of types of substances included in the pretreatment agent to be provided to the medium with respect to a unit weight of the medium.

Another possible configuration of the present invention includes one using a process management device, a printing method, and the like with the same features as those described above. Also with these configurations, for example, the same effects as those described above can be obtained.

Effect of the Invention

According to the present invention, for example, the condition for a pretreatment process can be appropriately determined.

BRIEF DESCRIPTION OF DRAWINGS

FIG. 2 is a diagram illustrating, in a simplified manner, an example of how a coating condition is determined.

FIG. 3 is a diagram illustrating a specific example of a library used by a controller 12 to determine the coating condition.

FIG. 4 is a diagram illustrating a pretreatment agent composition more in detail.

FIG. 5 is a diagram illustrating an example of a change as a result of changing the pretreatment agent composition.

FIG. 6 is a diagram illustrating an example of information on safety associated with the pretreatment agent composition.

FIG. 7 is a diagram illustrating, in a simplified manner, a modification of how the coating condition is determined.

FIG. 8 is a diagram illustrating a specific example of information stored in a library.

DESCRIPTION OF EMBODIMENTS

Figure 1:
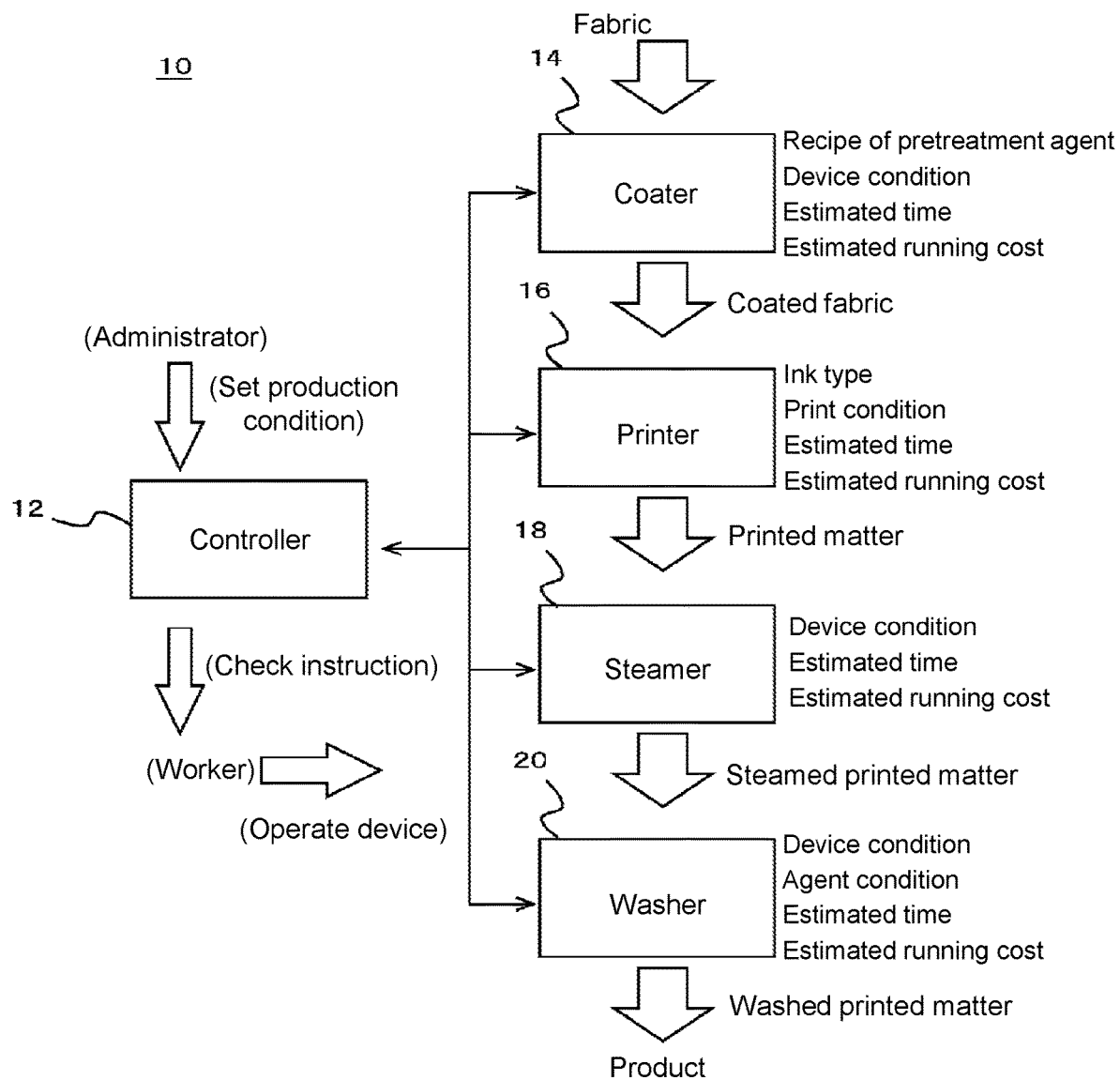
FIG. 1 is a diagram illustrating a printing system 10 according to an embodiment of the present invention.

Hereinafter, an embodiment of the present invention will be described with reference to the drawings. FIG. 1 is a diagram illustrating a printing system 10 according to an embodiment of the present invention. In the figure, an example of a configuration and an operation of the printing system 10 is illustrated. The printing system 10 of the present example may have features that are the same as or similar to those of known printing systems, except for the points described below. Devices forming the printing system 10 of the present example may have features that are the same as or similar to those of devices forming known printing systems, except for the points described below.

In the present example, the printing system 10 is a system that generates (produces) a product of printing (hereinafter, referred to as printed matter) obtained by performing at least printing, and generates the printed matter with predetermined pretreatment process and subsequent treatment process performed in addition to the print process. More specifically, the printing system 10 performs printing with an inkjet method on a medium such as fabric, to generate the printed matter. In this case, the printed matter generated can be regarded as a textile printed matter and the like, for example. To generate such a printed matter, the printing system 10 includes a controller 12, a coater 14, a printer 16, a steamer 18, and a washer 20.

The controller 12 is a computer for managing a production condition for generating the printed matter in the printing system 10. Furthermore, in the present example, the controller 12 is an example of a process management device, and manages, as the production condition, a condition for a process executed in each device in the printing system 10 and the like. Furthermore, the controller 12 is communicably connected to the devices in the printing system 10 through a network (LAN for example), and inputs and outputs data, commands, and the like as appropriate. In this case, an MDL command and the like may be suitably used for the command for example. The MDL command is a command generated based on MDL command SDK provided by MIMAKI ENGINEERING CO., LTD.

Furthermore, in the printing system 10 of the present example, the controller 12 inputs or outputs information to and from an administrator of the printing system 10 or a work staff as appropriate. In this case, the administrator of the printing system 10 can be regarded as, for example, a high-level user or the like who makes decision regarded the printed matter to be generated by the printing system 10 and the like. Furthermore, the work staff can be regarded as, for example, a user such as an onsite staff that performs operations and the like on each device of the printing system 10 as appropriate.

In this case, the controller 12 sets the production condition, in accordance with an instruction from the administrator of the printing system 10 for example. For example, when the production condition is set based on an instruction from the administrator, the production condition designated by the administrator is set based on an operation and the like performed by the administrator or another user who has received the instruction from the administrator. In the present example, the printing system 10 sets the fabric to be used, a coating condition, a print condition, a steaming condition, a washing condition, and the like as the production condition. In this case, the fabric to be used is a fabric used as a medium in the printing system 10. The coating condition, the print condition, the steaming condition, and the washing condition are conditions for processes executed by the coater 14, the printer 16, the steamer 18, and the washer 20. Furthermore, as will be described below, in the present example, the controller 12 determines the condition for each process executed in the printing system 10 as appropriate. Thus, the production condition set based on the instruction from the administrator can also be regarded as an initial value of the production condition or the like for example. Furthermore, the production condition can also be regarded as, for example, a condition for generating a target printed matter (desired product) or the like. The condition for each process may be determined by selecting any of a plurality of conditions prepared in advance as conditions for processes included in the production condition for example. The controller 12 may determine the condition for any of the processes, based on a condition for another process or the like. In this case, as the production condition set as the initial value by the controller 12, a condition for a process other than a process for which the condition is determined may be set. More specifically, the controller 12 of the present example proposes, for example, a coating condition or the like. An operation of proposing the coating condition and the like will be described in detail below.

The controller 12 controls the operation of each device in the printing system 10 based on the production condition. In this case, the controller 12 controls the operation of each device using, for example, a command such as an MDL command. The control based on command or the like may be difficult, depending on the condition for each process performed by each device and the like. In this case, the controller 12 controls the operation of each device through a manual operation by the work staff, by issuing an instruction to the staff through displaying on a monitor or the like for example. In the present example, the controller 12 can also be regarded as, for example, a job controller that manages and controls a production process performed by each device in the printing system 10 or the like.

The coater 14 is an example of a pretreatment machine, and executes a predetermined pretreatment process on the fabric used as the medium that is a target of printing in the print process executed by the printer 16. The pretreatment machine can also be regarded as, for example, a device that executes a predetermined pretreatment process before the print process for generating a printed matter or the like. In the present example, the coater 14 executes a coating process which is an example of the pretreatment process, on a medium before the print process is executed by the printer 16. The coating process is, for example, a process of coating the fabric medium with a predetermined pretreatment agent. Under the coating condition designated in the production condition set for the controller 12, the coater 14 executes the coating process on the fabric also designated under the production condition. Thus, the coater 14 generates the coated fabric under the production condition. In this case, the coater 14 generates an ink receiving layer on the fabric, by coating the fabric with the pretreatment agent before the printing for example. As the pretreatment agent, a known coating agent such as a known sizing agent can be suitably used.

In the coating process of the present example, the pretreatment agent used by the coater 14 includes a plurality of types of substances. As the coating condition which is the production condition for the coating process, a condition at least indicating the pretreatment agent composition is used. In this case, the pretreatment agent composition can be regarded as a recipe of the pretreatment agent designating the components of the pretreatment agent or the like for example. In the present example, the pretreatment agent composition is an example of pretreatment agent blending information indicating the composition of a plurality of types of substances included in the pretreatment agent. As the coating condition, for example, a condition further indicating a device condition and the like may be used. In this case, the device condition in the coating process can be regarded as, for example, a condition for designating an operation of the coater 14 or the like. In the present example, the coating condition is associated with an estimated time and an estimated running cost of the coating process. In this case, the estimated time and the estimated running cost can be regarded as, for example, predicted values of the time and the cost required when the process is executed under the associated production condition (such as the coating condition). The estimated time can also be regarded as, for example, a result of estimating the time required for executing each process on the medium or the like. The estimated running cost can also be regarded as, for example, a result of estimating the cost required for executing each process on the medium or the like.

The printer 16 is a printing device that executes the print process. In the present example, the printer 16 is an inkjet printer and performs printing on the coated fabric generated by the coater 14, by ejecting ink using the inkjet method. In this case, the coated fabric can be regarded as an example of a medium after the pretreated by the pretreatment machine or the like, for example. The printing performed by the printer 16 can be regarded as an act such as drawing an image by ejecting ink onto an ejection position designated by print data indicating the image to be printed for example. In the present example, the printer 16 receives the print data from the controller 12 and executes the print process under the print condition designated in the production condition set for the controller 12 for example. Thus, the controller 12 generates the printed matter under the production condition. More specifically, in the present example, the printer 16 executes the print process using ink for textile printing on the fabric. As the textile printing ink, ink for which color development processing is executed after the print process is used. As such ink, known textile printing ink and the like can be suitably used.

Furthermore, in the present example, a condition indicating the ink type, the device condition, and the like is used as the print condition related to the print process. In this case, the ink type can be regarded as, for example, a condition for designating the ink used for the printing by the printer 16 or the like. Furthermore, the device condition can be regarded as, for example, a condition for designating the printing operation performed by the printer 16 or the like. In the present example, the print condition is associated with the estimated time and the estimated running cost of the print process.

A case where the printing is performed with the inkjet method using the textile printing ink as in the present example can be regarded as a case where inkjet textile printing is performed in the print process. In the print process of the present example, the printer 16 directly ejects the textile printing ink onto a medium that finally becomes the printed matter. Thus, the print process executed in the present example can also be regarded as a process of performing direct textile printing and the like for example.

The steamer 18 and the washer 20 are examples of a subsequent treatment machine that executes the subsequent treatment process after the print process. The subsequent treatment machine can be regarded as, for example, a device that executes the subsequent treatment process or the like. The subsequent treatment process can be regarded as, for example, a process of performing a predetermined subsequent treatment on the medium after the print process executed by the printer 16 or the like. More specifically, the steamer 18 is an example of a color development processor, and executes a steaming process on the medium after the print process has been executed. In this case, the steaming process can be regarded as, for example, a process of executing the color development process of implementing color development for the textile printing ink by steaming the fabric to which the textile printing ink is attached using hot steam and the like. In this case, the steamer 18 can be regarded as, for example, executing the color developing process on the ink used in the print process as the subsequent treatment process. The color development process executed by the steamer 18 can be regarded as, for example, a color development process in a case where textile printing is performed on a fabric medium or the like. The color development process can also be regarded as, for example, a process of fixing the color after the printing or the like. In the present example, the steamer 18 executes the steaming process under the steaming condition designated in the production condition set for the controller 12. Thus, the steamer 18 generates the steamed printed matter under the production condition. Furthermore, in the present example, a condition indicating the device condition and the like is used as the steaming condition. In this case, the device condition in the steaming process can be regarded as a condition for designating an operation of the steamer 18 or the like for example. In the present example, the steaming condition is associated with estimated time and estimated running cost of the steaming process.

The washer 20 is a device that executes a washing process that is a process of performing washing processing for washing the printed matter after the color development process has been executed. The washing process can be regarded as a process of washing the medium onto which the ink has been ejected in the print process or the like for example. Furthermore, in this case, washing process can also be regarded as, for example, a process of removing excess ink, pretreatment agent, and the like attached on the fabric, or the like. In the present example, the washer 20 executes the washing process under the washing condition designated in the production condition set for the controller 12. Thus, the washer 20 generates the washed printed matter under the production condition. In the present example, the washed printed matter can be regarded as the printed matter generated by the printing system 10. Furthermore, in the present example, a condition indicating the device condition and the like is used as the washing condition. In this case, the device condition in the washing condition can be regarded as a condition for designating an operation of the washer 20 or the like for example. In the present example, the washing condition is associated with the estimated time and the estimated running cost of the washing process.

According to the present example described above, the printed matter can be appropriately generated for example. By managing the production condition, the controller 12 can implement centralized management over the processes executed by the devices of the printing system 10 for generating the printed matter for example. In this case, with the controller 12 managing the conditions for the processes in the printing system 10, an instruction to the work staff and the like can be appropriately made for example. As a result, the staff can easily and appropriately perform a work (such as a manual operation on each device for example) required for generating the printed matter, without being aware of the production condition or the like for example.

In conventional configurations, for example, generally, when a printed matter is generated through a plurality of processes such as the pretreatment process, the print process, and the subsequent treatment process, the processes are independently executed at different locations. Management is also individually performed on a condition of each of the processes. Furthermore, in conventional configurations, for example, generally, the work for each process relies on the advanced skill and the like of the work staff in many cases. In particular, the pretreatment process and the subsequent treatment process heavily rely on the advanced skill and personally accumulated knowledge and the like of the staff. Since the advanced skill and the like are required for each process, with the conventional configuration, the pretreatment process and the subsequent treatment process are generally outsourced to contractors specialized in those processes. Thus, conventionally, it has been difficult for companies or the like that perform print processes to implement insourcing of the pretreatment process and the subsequent treatment process to execute these processes by themselves or the like. On top of that, various conditions and skills are required for each process, meaning that a long time and a large amount of cost are required for training a staff to be able to execute the plurality of processes for example. All things considered, in the context of the conventional configuration, the insourcing of the pretreatment process and the subsequent treatment process leads to a heavier reliance on staffs executing the pretreatment process and the subsequent treatment process (reliance on the level of proficiency of individual work staff), which may result in a higher risk of quality fluctuation for example.

In view of this, in the present example, the controller 12 manages the production condition. Thus, for example, the condition can be set for each process, without relying on the advanced skill and the like of the work staff. More specifically, in the present example, an instruction indicating important matters regarding the production and the like can be precisely issued to the work staff, through displaying on a monitor of the controller 12 or the like. In this case, the knowledge and cautions regarding each process, which has been personally memorized by the staff with the conventional configuration, can be managed by the controller 12 instead of people. Thus, according to the present example, a staff not having the advanced skill and the like can more appropriately perform an operation on the device used in each process and the like, for example. This means that the printed matter can be stably produced without investing time and effort for staff training or the like for example. Furthermore, in this case, each process can be appropriately executed even when the work staff is replaced. This can prevent, for example, stopping of the entire production operation due to an absence of the staff for some of the processes and the like for example.

Furthermore, in the present example, delivery of the condition for each process from the controller 12 to the corresponding device may be performed through transmission (automatic transmission for example) over a network or the like for example. More specifically, in this case, a configuration may be employed in which, for example, the staff is only in charge of works requiring manual operations such as replenishment of consumables and conveyance of items, whereas the controller 12 directly controls each device with regard to setting of the device condition and the like. With this configuration, for example, process automation, reduction of human error, and the like can be appropriately achieved. Furthermore, for example, even in a case where a plurality of staffs take turn to perform work for a single process, the production of the printed matter can be appropriately implemented without requiring inquiry, checking, and the like through verbal instruction and the like. Furthermore, in the present example, for example, various conditions (such as, for example, detailed conditions for the pretreatment process and the subsequent treatment process) affecting the quality of the printed matter are automatically set, so that stabilization of the quality of the printed matter and the like can be further achieved. This further enables the pretreatment process and the subsequent treatment process to be executed without relying on the personal skill of the work staff and the like for example.

The devices forming the printing system 10 may not necessarily be installed at the same location (such as office or factory), and may operate while being installed at different locations. In this case, for example, execution of the pretreatment process, the print process, and the subsequent treatment process at locations different from each other and the like are conceivable. Furthermore, execution of some of a plurality of processes (the subsequent treatment process and the print process for example) at a single location and execution of the remaining process (the pretreatment process for example) at another location and the like are conceivable. With this configuration, the scale of the printing system 10 can be more easily enlarged as appropriate for example. Also in this case, the printed matter can be appropriately generated with the controller 12 used for managing the conditions for the processes and the like.

As described above, in the present example, the controller 12 sets the production condition based on an instruction from the administrator of the printing system 10 for example. Furthermore, the controller 12 adjusts the conditions for the processes executed in the printing system 10 as appropriate. More specifically, in the present example, the controller 12 determines the coating condition based on the condition for the printed matter to be generated in the printing system 10 or the like for example. In this case, the condition for the printed matter is a condition indicating the state of the medium after execution of at least the print process. In the present example, the condition of the printed matter is an example of the condition for the product of printing. The coating condition is an example of a condition for the pretreatment process.

Next, an operation for determining the coating condition and the like is described in detail, as an example of the management for the conditions for the processes executed in the printing system 10. FIG. 2 is a diagram illustrating, in a simplified manner, an example of how the coating condition is determined. In the present example, the controller 12 determines the coating condition using a library storing various types of information for determining the coating condition. In this case, determining the coating condition may be determining a coating condition as a candidate of the coating condition that is actually used for example. Furthermore, determining the candidate coating condition can also be regarded as proposing the coating condition or the like for example. Furthermore, in the present example, the library is an example of condition association information in which the condition for the printed matter and the condition for the pretreatment process are associated with each other. The library can also be regarded as, for example, a library or the like used for managing the processes executed in the printing system 10.

Furthermore, in the present example, the control 12 determines the coating condition using, for example, a library stored in a storage unit (HDD or the like) of the controller 12. The controller 12 may determine the coating condition using, for example, a library stored in a storage unit of another computer or the like. In this case, the controller 12 communicates with the other computer, to use the library stored in the storage unit of the other computer. The other computer storing the library may be installed outside the printing system 10.

In the present example, as the library, for example, information associating the pretreatment agent composition that is at least part of the coating condition with a plurality of parameters indicating the performance of the printed matter or the like is used. More specifically, in the case of the library illustrated, as can be seen in information 1 to information 5 and the like distinguished from each other, each of the pretreatment agent compositions of a plurality of types of pretreatment agents different from each other is associated with a performance related parameter. In this case, the pretreatment agent composition indicates the composition of pretreatment agents including a plurality of types of substances and water, illustrated as agents A to D and the like distinguished from each other in the drawing. As the performance related parameter illustrated as performances A to D and the like distinguished from each other in the drawing, parameters as numerical values indicating high, low, and the like of a plurality of types of performances are used.

In the library, as the performance associated with a pretreatment agent composition, printed matter performance information indicating the performance of the printed matter achieved when the pretreatment agent is generated with such a pretreatment agent composition or the like may be used. In this case, the performance related parameter can also be regarded as, for example, a parameter indicating a condition for the desired printed matter or the like. The condition for the desired printed matter can be regarded as, for example, a condition for a printed matter to be generated in the printing system 10 or the like. In the library, the pretreatment agent composition may be further associated with the device condition for each device in the printing system 10 or the like. In this case, for example, the device condition for the coater 14 (see FIG. 1) executing the coating process or the like may be further associated. For example, the pretreatment agent composition may be further associated with the estimated time, the estimated running cost, and the like of each process executed in each device in the printing system 10. In these cases, the library can be regarded as, for example, information in which these types of information are recorded in combination or the like.

When determining the coating condition, the controller 12 receives a desired state for these performances and the like from the user. More specifically, in this case, for example, the controller 12 presents a plurality of parameters respectively associated with the plurality of types of performances, to the user such as the administrator of the printing system 10, the staff, or the like, through display on a monitor or the like for example. In this case, the parameters presented to the user can be regarded as, for example, input parameters corresponding to the performance of the printed matter or the like. These input parameters can be regarded as, for example, an input parameter indicating the performance, as in the case of the performance related parameter used in the library, or the like. Furthermore, the controller 12 receives, from the user, an instruction to change the value of at least any of the plurality of parameters (input parameters), through an input/output unit and the like of the controller 12. Thus, the controller 12 receives the designated condition for the desired printed matter and the like from the user, for example.

After receiving the designated condition for the desired printed matter and the like from the user, the controller 12 performs a search on the library to narrow down the information satisfying the condition for the desired printed matter and the like. Then, candidates of the information satisfying the condition for the desired printed matter and the like are proposed, through displaying of the narrowed down information on the monitor and the like for example. In this case, the candidate of the information satisfying the condition for the desired printed matter and the like can be regarded as, for example, an example of the coating condition proposed by the controller 12 and the like. Furthermore, the information satisfying the condition for the desired printed matter and the like can be regarded as, for example, information satisfying, with a predetermined level of accuracy, the condition for the desired printed matter designated by the user, in the information stored in the library or the like. In the present example, as illustrated in the figure for example, the controller 12 proposes a plurality of pieces of information to the user, as candidates of the information satisfying the condition for the desired printed matter or the like. In this case, for each information such as information 3 and information 5 in the figure, the pretreatment agent composition and a value of the performance related parameter are associated with each other. Thus, each pretreatment agent composition is proposed in association with the state of the printed matter achieved when the pretreatment agent composition is used and the like.

After proposing the candidate information to the user, the controller 12 receives an instruction to select information (optimum information) from the candidates from the user. This configuration enables the user to appropriately select the coating condition for generating the printed matter in the desired state for example. Furthermore, in this case, the controller 12 notifies the user of the information (selected information) selected by the user, for example, by display on a monitor or the like. According to the present example, for example, proposing of the coating condition to the user and the like can be appropriately implemented. In this case, the coater 14 executes the coating process reflecting the coating condition (selected information) proposed by the controller 12 for example. More specifically, in this case, the pretreatment agent generated based on the proposed pretreatment agent composition is expected to be used in the coating process. With this configuration, the printed matter in the desired state can be appropriately generated for example.

In the above description, the coating condition determined using the library is described while focusing on the pretreatment agent composition, for the sake of simplicity. Still, as described above, the possible coating condition further includes the device condition in the coating process and the like. Thus, the controller 12 may further propose the device condition as the coating condition. In this case, information further using the parameter related to the device condition may be used as the library. Furthermore, in this case, for example, a parameter indicating the performance associated with the device condition may be used as a parameter corresponding to any of performances A to D and the like illustrated in the figure.

More specifically, in the coating process, for example, the coater 14 may perform the coating using the pretreatment agent, with a parameter designating the operation of the coater 14 and the like designated for example. In this case, the controller 12 may propose information indicating which value should be designated for such a parameter for example, as at least part of the coating condition. With this configuration, for example, the controller 12 can appropriately propose the device condition of the coater 14, as at least part of the configuration for the pretreatment process. In this case, the device condition for the coater 14 is an example of pretreatment device condition information. The pretreatment device condition information can be regarded as, for example, information for designating the operation of coating using the pretreatment agent by the coater 14 and the like. This configuration can make the coater 14 more appropriately execute the coating process for example.

Furthermore, when the controller 12 proposes the device condition as the coating condition, the coater 14 may be caused to execute the coating process under the device condition, with the user operating the coater 14 based on the device condition proposed by the controller 12 through display on the monitor and the like for example. Furthermore, in this case, the operation of the coater 14 can be regarded as, for example, an operation of executing the coating process under the condition for the coating process set by the user for example. This configuration can make the coater 14 appropriately execute the coating process based on the coating condition proposed by the controller 12 for example.

Furthermore, as described above, in the present example, the controller 12 proposes a plurality of information candidates for the coating condition, to determine the coating condition by making the user select any information among the candidates. On the other hand, according to a modification of the operation of the controller 12, for example, only one candidate may be proposed to the user, meaning that the user does not perform the selection from the plurality of candidates. Furthermore, a case is conceivable such as that where the device condition, proposed as the coating condition, is proposed directly to the coater 14 by the controller 12, without involving the manual operation of the user for example. In this case, the controller 12 proposes the coating condition by performing setting, corresponding to the device condition, on the coater 14 via a network or the like, for example. In this case, the coater 14 executes the coating process under the coating condition set by the controller 12 for example.

As described above, in the present example, the controller 12 receives the designation of the condition for the desired printed matter and the like for example from the user. Thus, the operation of the controller 12 can be regarded as, for example, an operation of determining the coating condition to be proposed based on the condition for the printed matter received from the user for example. The controller 12 may propose and determine the coating condition, in such a manner that a condition other than the condition for the desired printed matter can be further taken into consideration for example. In this case, for example, proposing of the coating condition in association with time, cost, and the like required for at least any of the processes executed by the printing system 10 and the like may be performed. More specifically, in this case, for example, the controller 12 proposes the coating condition in association with at least one of the estimated time and the estimated running cost related to at least any of the processes executed on the medium. The estimated time and the estimated running cost related to each process can be regarded as, for example, the estimated time and the estimated running cost in a case where the coating condition proposed is used and the like. With this configuration enabling various conditions to be taken into consideration, for example, the coating condition can be more appropriately determined. Furthermore, in this case, a case is conceivable such as that where the time and cost required for executing each process is taken into consideration as the desired performance. In this case, for example, a parameter corresponding to the time and cost required for execution of each process may be used as the parameter corresponding to any of the performance A to the performance D and the like illustrated in the figure. With this configuration, for example, the coating condition can be more appropriately determined under various conditions.

Thus determining the coating condition while taking such various conditions into consideration can also be regarded as, for example, determining the coating condition based on a condition for a process other than the coating process. Thus, the operation of thus determining the coating condition can also be regarded as, for example, an example of an operation of determining a condition for any of the processes based on a condition for another process and the like, or the like. The coating condition may be determined further based on part of the coating condition. In this case, an operation of determining the coating condition based on part of the coating condition can be regarded as, for example, an operation of receiving the designation for part of conditions included in the coating condition from the user, and determining at least part of the other conditions included in the coating condition based on the received information, or the like. In this case, for example, a parameter corresponding to part of the coating condition may be used as the parameter corresponding to any of the performance A to the performance D and the like illustrated in the figure.

The operation of proposing the coating condition by the controller 12 can also be regarded as, for example, an operation of a search system that searches for a process condition or the like. In this case, the operation of the controller 12 can be regarded as, for example, a flow in which the user such as the staff for the coating process or the like inputs a desired item to the search system, the library is searched based on the input information, and a candidate pretreatment agent composition, candidate printed matter performance information, or the like is output. In this case, the desired item can be regarded as, for example, an input item and the like indicating a request for the performance of the printed matter generated by the printing system 10, a request for operations in the processes in the printing system 10, and the like. More specifically, a possible example of an item used for the desired item includes a request for improvement in the performance of the printed matter, a request for reduction of time required for completing the operation of each device, a request for reducing the running cost of each device, or the like. Furthermore, as the item to be input by the user, for example, an additionally desired item, an item desired not to be compromised, and the like may be further used. In this case, the additionally desired item can be regarded as, for example, an item for fulfilling the request with a low priority and the like. The item desired not to be compromised can be regarded as, for example, an item for which at least a predetermined level of performance or higher is desired and the like. With such items further used, for example, the coating condition satisfying the condition desired by the user can be more appropriately searched for.

As described above, according to the present example, the coating condition can be easily and appropriately determined. Furthermore, for example, the configuration enables the coating process to be appropriately executed, even in a case where a staff with not much knowledge on the textile printing or the like becomes the user of the coater 14 or the like. The configuration further enables the maintaining of a certain level of quality of the printed matter, adjusting of the performance of the printed matter, and the like to be more easily achieved for example. In this case, the configuration further enables expansion of the condition adjustment range and the like compared with a case where the coating condition is determined through conventional method and the like for example, because the coating condition is determined without relying on the personal skill, knowledge, and the like of the user.

More specifically, for example, under a conventional coating condition, the coating condition may be determined by actually generating the printed matter and adjusting the coating condition based on the state of the printed matter. In this case, to determine the coating condition for various printed matters generated by the printing system 10, the checking and adjusting are required each time the printed matter generated changes, meaning that a larger amount of labor/cost is required. Furthermore, in this case, the user such as the work staff checks the state of the printed matter, meaning that reliance on the personal skills, knowledge, and the like of the user is heavy. This may result in, for example, unstable quality of the printed matter due to a difference in how the coating condition is adjusted between staffs or the like. On the other hand, according to the present example, for example, the coating condition can be appropriately determined without actually generating the printed matter. In this case, for example, the coating condition can be more appropriately determined even when the work staff changes, because the condition for the pretreatment process is determined without relying on the personal skills, knowledge, and the like of the work staff. Thus, for example, the printed matter of the same quality can be generated regardless of the location or the user, that is, by anyone and at any part of the world.

The present example enables the coating condition to be more easily adjusted. Thus, for example, the coating condition can be appropriately determined without performing testing for a plurality of times as in conventional methods. Thus, for example, work time, medium cost, cost for pretreatment agent, and the like required for the testing can be appropriately reduced. As described above, for example, in the present example, a case is conceivable such as that where the coating condition is determined while taking into account the estimated time, the estimated running cost, and the like for each process. In this case, for example, more appropriate and easily management on the operation time, the running cost, and the like on each device and the like can be achieved.

Next, how the coating condition is determined and the like will be described more in detail. FIG. 3 is a diagram illustrating a specific example of a library used by the controller 12 to determine the coating condition, and illustrates an example of information stored in the library. In FIG. 3, 13 types of information are illustrated with at least part of the information stored in the library denoted by numbers 1 to 13 (#1 to 13) to be distinguished from each other. Furthermore, in the illustrated case, each of these types of information is information in which the pretreatment agent composition, the workability regarding the coating process, the cost of the coating process, and the performance of the printed matter are associated with each other.

In each of these types of information, the pretreatment agent composition indicates a composition ratio (weight composition ratio) of substances illustrated in the figure. The workability and cost regarding the coating process indicate the workability and cost in a case where the pretreatment agent of the pretreatment agent composition in the information of the corresponding number is used. A case is conceivable such as that where the workability and cost regarding the coating process are for example, presented to the user in association with the pretreatment agent composition, when the controller 12 proposes the coating condition. With this configuration, for example, the coating condition can be more appropriately selected by the user. In this case, the workability and cost regarding the coating process can be regarded as, for example, reference information corresponding to the pretreatment agent composition or the like. The workability and cost regarding the coating process can also be regarded as indicating the performance of the coating process for example. In this case, use of an input parameter corresponding to the workability and cost regarding the coating process and the like are conceivable, at the time of the search on the library performed by the controller 12. As the workability regarding the coating process, for example, the viscosity, pH, and solubility of the pretreatment agent may be associated with the pretreatment agent composition. In this case, the solubility of the pretreatment agent may indicate whether the pretreatment agent of the composition indicated by the pretreatment agent composition completely dissolves for example. As the cost regarding the coating process, for example, the unit price of the pretreatment agent may be associated with the pretreatment agent composition.

In the case illustrated in the figure, as the performance of the printed matter, the performance regarding the print concentration, hue (the size of the gamut range), and smearing is provided in the scale of 1 to 5. Furthermore, as the print concentration, the front surface concentration and the back surface concentration are provided for ink of each color used for the printing. In this case, the front surface concentration and the back surface concentration are the concentration of the ink on the front surface and the back surface of the medium at the point when the generation of the printed matter is completed in the printing system 10. The point when the generation of the printed matter is completed in the printing system 10 can be regarded as, for example, a point after the subsequent treatment process executed by the steamer 18 and the washer 20 after the print process has been executed by the printer 16 or the like. With these types of information used as the performance of the printed matter, the coating condition for obtaining the desired printed matter can be appropriately determined based on the library for example. The configuration further enables the printing system 10 to appropriately generate the desired printed matter for example.

The information stored in the library is not limited to those described above, and can be changed in various ways. How the information is managed and the like can also be changed in various ways. More specifically, a composition using substances of a wider variety can be used as the pretreatment agent composition for example. Various substances used in the pretreatment agent composition may be categorized, based on the function, the intended purpose, and the like of the substance, and managed as illustrated in FIG. 4 for example. FIG. 4 is a view illustrating the pretreatment agent composition more in detail, and illustrates an example of a method of categorizing and managing, when more types of substances than those illustrated in FIG. 3 are used, the substances based on their functions, intended purposes, and the like.

As components of the pretreatment agent, for example, substances each functioning as any of sizing agent, pH regulator, stimulant, water retention agent, dark dyes (chelating agent), and anti-reduction agent may be used. In this case, the substances used as the components of the pretreatment agent may be categorized and managed as sizing agent, pH regulator, stimulant, water retention agent, dark dye (chelating agent), and anti-reduction agent which are major categories in the figure for example. In this case, at least some of items in the major categorizes may be further categorized into intermediate categories to be managed. For example, in the illustrated case, the sizing agent is categorized into intermediate categories to be managed. The intermediate categories include natural paste, processed paste, semi-synthetic paste, and synthetic paste. For the specific substances used for the components of the pretreatment agent, use of various specific substances for the major categories or the intermediate categories is conceivable, as can be seen in the fields for the intermediate and minor categories in the figure.

With such various substances used as the components of the pretreatment agent, for example, various conditions can be more appropriately determined for the coating condition.

In this case, by using the hierarchical categorization as illustrated in the figure for example, the components of the pretreatment agent can be appropriately categorized based on the function, the intended purpose, and the like of the substances. Furthermore, the configuration enables the pretreatment agents or various compositions to be easily and appropriately proposed at the time of determination of the coating condition and the like for example.

At the time of execution of the coating process, for example, the pretreatment agent may be generated based on the pretreatment agent composition designated by the coating condition determined. With such a configuration, for example, pretreatment agents of various compositions can be appropriately used. Depending on the pretreatment agent composition, for example, a pretreatment agent generated in advance may be used instead of generating the pretreatment agent after the coating condition has been determined. The components of the pretreatment agent are not limited to the substances illustrated, and other substances may be further used.

When the coating condition is changed, the processes executed in the printing system 10, the performance of the printed matter finally obtained, and the like may change in various ways. More specifically, when the composition of the pretreatment agent is changed, a change may occur in various matters as illustrated in FIG. 5 for example. FIG. 5 is a diagram illustrating an example of a change occurring as a result of a change in the composition of the pretreatment agent, and illustrates examples of a varying parameter corresponding to an example of a change in each process or performance of the printed matter due to the change in composition of the pretreatment agent. In FIG. 5, the examples of the varying parameters are illustrated while being classified into two classifications of process and product performance. In this case, the process classification can be regarded as, for example, a classification related to each process executed in the printing system 10 and the like.

Furthermore, in FIG. 5, the classification corresponding to the process is categorized into major categories respectively corresponding to the entirety, the pretreatment process, the print process, the steaming process, and the washing process. In this case, entirety indicate all of the processes executed in the printing system 10. The major category corresponding to the entirety is further categorized into intermediate categories respectively corresponding to the time required for the entirety, the cost required for the entirety, and the safety of the entirety. Each of the items of the intermediate categories are associated with the varying parameter illustrated in the figure. The major category corresponding to the pretreatment process is further categorized into intermediate categories corresponding to the pretreatment agent and the device condition respectively. The items of the intermediate categories are further categorized into minor categories illustrated in the figure. Each of the items of the minor categories is associated with the varying parameter illustrated in the figure. The major category corresponding to the print process is further categorized into intermediate categories corresponding to the ink and the device condition respectively. The items of the intermediate categories are further categorized into minor categories illustrated in the figure. Each of the items of the minor categories is associated with the varying parameter illustrated in the figure. For the major categories respectively corresponding to the steaming process and the washing process, only the intermediate category corresponding to the device condition is used. Each item of the intermediate category is further categorized into minor categories illustrated in the figure. Each of the items of the minor categories is associated with the varying parameter illustrated in the figure.

The classification corresponding to the product performance can be regarded as the classification related to the performance of the printed matter or the like for example. In the case illustrated in the figure, the varying parameter illustrated in the figure is associated with the classification corresponding to the product performance. As can be understood from the matters illustrated in FIG. 5 and the like, a change in the composition of the pretreatment agent imposes various impacts not only on the coating process but also on subsequently executed processes as well as the performance of the printed matter. Thus, when changing the composition of the pretreatment agent, such various impacts need to be taken into consideration. In view of this, according to the present example, the library described above is used for determining the coating condition for example, so that the various impacts can be appropriately taken into consideration. Furthermore, with this configuration, the coating condition can be easily and appropriately determined for example. The impact of a change in the composition of the pretreatment agent can also be regarded as, for example, a change in the performance due to a change in the composition of the pretreatment agent or the like.

Furthermore, among the varying parameters associated with the respective items, the varying parameters corresponding to the cost and time can be regarded as, for example, parameters indicating cost, time, and the like required for each item in a case where a certain coating condition is employed. The varying parameter corresponding to safety can be regarded as, for example, a parameter or the like indicating the relationship between a certain coating condition and a predetermined safety regulation in a case where such a coating condition is employed. The varying parameter corresponding to the classification of the product performance can be regarded as, for example, a parameter indicating the result of evaluation with each item in the figure and the like.

As matters that change due to a change in the coating condition, matters other than those illustrated in FIG. 5 may be taken into consideration. A case is conceivable such as that where at least some of the matters illustrated in FIG. 5 is taken into consideration more in detail. In this case, for example, a case is conceivable such as that where safety regarding various substances (agents) used as the components of the pretreatment agent is taken into consideration. More specifically, for a substance used as the component of a pretreatment agent, for example, it may be necessary to take into account safety based on various regulations and the like. In addition, whether a regulation is violated or not may depend on the blending ratio of the substances in the pretreatment agent. In this case, for example, as illustrated in FIG. 6 for example, the composition of the pretreatment agent indicated by the pretreatment agent composition may be associated with safety-related information. In this case, for example, the safety-related information may be presented to the user in association with the pretreatment agent composition, at the time when the coating condition is proposed or the like.

FIG. 6 is a diagram illustrating an example of the safety-related information associated with the pretreatment agent composition, and illustrates an example of information on safety associated with one specific example of the pretreatment agent composition. In this case, as the safety, for example, information on restriction or ban on use or import and the like under the regulations of each country may be taken into consideration. Furthermore, as such matters, for example, RoHS, REACH, other chemical substance inventory regulations of each country (For example, EC. TSCA, Chemical Examination Law), and the like may be taken into consideration. Furthermore, as safety, for example, danger/hazard information on the substances used as the component of the pretreatment agent and the pretreatment agent prepared with such substances blended and the like may be taken into consideration. As such matters, information obtained by GHS, CLP, or Ames test or the like may be taken into consideration for example. In this case, the safety of the pretreatment agent may be determined based on the information on each of the substances used as the components of the pretreatment agent.

More specifically, FIG. 6 illustrates an example of the safety-related information on each substance and the pretreatment agent as a whole, while taking into account the blending ratio of the substances used as the components of the pretreatment agent that is a specific example of the pretreatment agent composition illustrated in the figure. As an example of the safety-related information, information determined based on a plurality of regulations and the like illustrated in the figure is illustrated. FIG. 6 further illustrates a cost (unit cost) of each substance used as the component of the pretreatment agent, as reference information. Furthermore, the blending ratio and the cost are illustrated while being denoted by characters a to h and A to H, instead of specific numerical values, for the sake of illustration. With the safety thus taken into consideration, for example, the coating condition can be more appropriately determined.

Now, a supplementary description will be given on the configurations described above. In the following description, the term "present example" is assumed to cover the various modifications and the like described above, for the sake of description. As described above, in the printing system 10 of the present example, the coating condition is determined using the library by the controller 12, and the coating process is executed by the coater 14 under the coating condition. In this case, the coater 14 executes the coating process on the medium in a manner that is the same as or similar to a known coating process, under the coating condition for example. More specifically, the coating process may be executed by, for example, a method of immersing the medium in the pretreatment agent (immersion method), a method of spraying the pretreatment agent onto the medium (spray method), or the like. The coating process may be executed by, for example, a method of coating the medium with the pretreatment agent using a roller, a dispenser, or the like (roller method, dispenser method).

In this case, for example, an attempt to adjust the coating condition with conventional methods would generally require advanced skills and knowledge of the work staff and the like, as well as multiple trials and errors. Furthermore, a difference or the like in skills and knowledge between staffs is likely to lead to a variation in quality or the like due to a different staff being in charge. On top of these, selection of the material of the agent used for the pretreatment agent and the determination on the composition would be difficult. This may result in a situation such as that where companies hesitate in newly starting their businesses in the field requiring the coating process for example. On the other hand, according to the present example, as described above, for example, the coating condition can be more easily and appropriately determined without relying on the skill, knowledge, and the like of the staff. Furthermore, with the configuration, for example, a human-related impact such as variation in quality due to a different staff being in charge can be suppressed, whereby the reproducibility of the printed matter can be improved. Furthermore, the information accumulated in the library (databased library) is used instead of the knowledge depending on each person or the like. Thus, for example, even a new user with no knowledge on the coating process or the textile printing can easily obtain a printed matter on which the textile printing has been appropriately performed. This also enables encouraging of companies to newly start their businesses in a field requiring the coating process or the like for example.

The coating process by the coater 14 can also be performed by the inkjet method using the coater 14 including an inkjet head for example. With this configuration, for example, highly accurate digital control can be appropriately performed on the coater 14. Furthermore, with the configuration, the coating process can be executed appropriately under the coating condition without relying on the skills, knowledge, and the like of the staff for example.

However, when the coating process is executed using the inkjet head, the viscosity of the pretreatment agent needs to be set to be within a range enabling the pretreatment agent to be ejected from the inkjet head. Furthermore, there may be a limitation on pH or the like of the pretreatment agent. Thus, in this case, various properties of the pretreatment agent may be restricted within an extremely small range. Furthermore, when the pretreatment agent is optimized to be ejected from the inkjet head, adjustment is further required for degassing, drying, surface tension, and the like. In this case, even a staff with advanced skills and knowledge or the like may be difficult to adjust the coating condition such as the pretreatment agent composition and the like. In view of this, in the present example, the controller 12 determines the coating condition using the library prepared in advance and the like. Thus, when the coating process is executed by the inkjet method, the coating condition can be more easily and appropriately determined.

The pretreatment agent composition in the coating condition and the like have been mainly described above as an example of the condition for the pretreatment process associated with the condition for the printed matter in the library. On the other hand, according to a modification of the configuration of the library, a condition other than the pretreatment agent composition may be used as a condition for the pretreatment process associated with the condition for the printed matter. In this case, for example, use of information indicating the amount of each substance, included in the pretreatment agent, to be attached to the medium instead of the pretreatment agent composition, or the like is conceivable for example.

More specifically, in this case, as at least part of the coating condition for the coating process executed as the pretreatment process in the library, for example, a substance weight ratio indicating the weight of each of a plurality of types of substances included in the pretreatment agent to be provided to the medium, with respect to the unit weight of the medium may be used. The substance weight ratio can be regarded as, for example, a ratio of a weight of the agent to the fabric weight of the fabric used as the medium (% o.w.f. value) or the like. Furthermore, such a library can also be regarded as, for example, information on the % o.w.f. value of each agent input in advance and the like. With this configuration, for example, it is possible to more reliably designate the amount of each substance, included in the pretreatment agent, to be attached to the medium. This configuration further enables the condition for the coating process to be more appropriately proposed, to suppress the impact or the like due to a difference in how the coating with the pretreatment agent is performed in the coating process and the like for example. The operation of determining the coating condition using such a library can be regarded as, for example, an example of an operation of managing the performance of the pretreatment agent based on the product performance regarding the amount of agent on the cloth and the like.

Also when such a library is used, the coating condition can be determined as in the case of the operation described above with reference to FIG. 2 and the like. FIG. 7 is a simplified view of a modification of how the coating condition is determined, and illustrates an example of an operation of determining the coating condition using a library in which the condition for the printed matter is associated with the substance weight ratio. The operation of determining the coating condition in the present modification is the same as or similar to the operation described above with reference to FIG. 2, except for the points described below.

In the present modification, as at least part of the coating conditions, the substance weight ratio for each substance (agent) included in the pretreatment agent is used. As the library, information in which a plurality of parameters indicating the performance of the printed matter and the like are associated with the substance weight ratio is used. More specifically, in the case of the library illustrated in the figure, each of a plurality of types of substance weight ratios different from each other is associated with a parameter related to the performance, as can be seen in information 1 to information 5 and the like illustrated while being distinguished from each other. In this case, the substance weight ratio indicates a ratio of a weight (% o.w.f. value) of the pretreatment agent including water and a plurality of types of substances illustrated while being distinguished from each other as agents A to C to be provided to the medium to the unit weight of the medium. As the performance related parameter illustrated as performances A to D and the like distinguished from each other in the drawing, parameters as numerical values indicating high, low, and the like of a plurality of types of performances are used. In the library, as the performance associated with the substance weight ratio, it is conceivable to use printed matter performance information indicating the performance of the printed matter achieved when the pretreatment agent is generated with such a substance weight ratio or the like. The performance related parameter can be regarded as, for example, a parameter indicating a condition for the desired printed matter or the like, as in the case described with reference to FIG. 2.

When determining the coating condition, the controller 12 receives from the user, designation of the condition for the desired printed matter and the like, as in the case described with reference to FIG. 2 for example. After receiving the designated condition for the desired printed matter and the like from the user, the controller 12 performs a search on the library to narrow down the information satisfying the condition for the desired printed matter and the like. Then, candidates of the information satisfying the condition for the desired printed matter and the like are proposed, through displaying of the narrowed down information on the monitor and the like for example. Also in the present modification, as illustrated in the figure for example, the controller 12 proposes a plurality of pieces of information to the user, as candidates of the information satisfying the condition for the desired printed matter or the like. In this case, for each information such as information 3 and information 5 in the figure, the substance weight ratio and a value of the performance related parameter are associated with each other.

Thus, each substance weight ratio is proposed in association with the state of the printed matter obtained when the substance weight ratio is used and the like.

After proposing the candidate information to the user, the controller 12 receives an instruction to select information (optimum information) from the candidates from the user. This configuration enables the user to appropriately select the coating condition for generating the printed matter in the desired state for example. Furthermore, in this case, the controller 12 notifies the user of the information (selected information) selected by the user, for example, by display on a monitor or the like. Also in the present modification, the coater 14 executes the coating process reflecting the coating condition (selected information) proposed by the controller 12 for example.

In the present modification, the pretreatment agent used in the coating process may be generated to achieve the substance weight ratio selected. In this case, for example, the pretreatment agent composition may be determined based on the substance weight ratio and the pretreatment agent may be generated based on the pretreatment agent composition, while further taking into account the condition designating how the coating is performed with the pretreatment agent in the coating process or the like. As the condition for designating how the coating is performed with the pretreatment agent in the coating process, a parameter designating the operation of the coater 14 or the like may be used for example. More specifically, as the condition designating how the coating is performed with the pretreatment agent in the coating process, for example, a pickup ratio may be used which is a ratio of the weight of the pretreatment agent coated to the weight of the medium. In this case, the controller 12 presents to the user, the substance weight ratio and the pickup ratio, based on the coating condition selected by the user in accordance with a required specification of the performance of the printed matter or the like for example. In this case, the user determines the pretreatment agent composition based on the substance weight ratio and the pickup ratio for example. With this configuration, for example, the coating condition can be appropriately determined based on the substance weight ratio stored in the library.

The controller 12 may present to the user, the pretreatment agent composition and the pickup ratio for achieving the substance weight ratio in the coating condition selected by the user, instead of the substance weight ratio and the pickup ratio. More specifically, in this case, the controller 12 proposes, for example, the pickup ratio and the pretreatment agent composition based on the substance weight ratio associated with the condition for the printed matter, as the condition for the pretreatment process in the library. With this configuration, for example, the specific composition of the pretreatment agent can be more appropriately determined based on the library using the substance weight ratio as the condition for the pretreatment process. Furthermore, in this case, the pretreatment agent composition and the pickup ratio likely to be intuitively understandable by the user are presented to the user. Thus, for example, the user can more easily generate the pretreatment agent achieving the substance weight ratio stored in the library for example.

Here, the pickup ratio can be regarded as the ratio of the weight of the pretreatment agent to the weight of the medium in a state immediately after being coated with the pretreatment agent or the like for example. The state immediately after the medium is coated with the pretreatment agent can be regarded as, for example, a state where the medium is coated with the pretreatment agent but is not squeezed or the like. The pickup ratio can also be regarded as, for example, a value obtained by dividing the amount of increase in the weight of the medium as a result of the coating with the pretreatment agent by the weight of the medium before being coated by the pretreatment agent and the like.

The pickup ratio may be determined by the controller 12 in accordance with the performance, specification, and the like of the coater 14 used for the coating process for example. The controller 12 may propose, for a single type of substance weight ratio, a plurality of pickup ratios to the user. In this case, the single type of substance weight ratio is the substance weight ratio associated with the parameter related to the performance of the printed matter in one information in the library (any one of the information 1 to the information 5 and the like for example). In this case, in association with each of the plurality of pickup ratios, the pretreatment agent composition in a case where the pickup ratio is employed may be presented to the user. With this configuration, for example, the pretreatment agent composition corresponding to the pickup ratio desired by the user can be appropriately presented to the user.

The pickup ratio may be determined through more direct user designation, by receiving the designated pickup ratio from the user by the controller 12 and the like for example. In this case, the user designates the pickup ratio while taking into account a condition for drying the medium, conveyability of the medium, or the like for example. The controller 12 proposes the pretreatment agent composition to the user, based on the substance weight ratio associated with the condition for the printed matter as the coating condition in the library, and the pickup ratio designated by the user for example. Also with this configuration, for example, the specific composition of the pretreatment agent can be appropriately determined based on the library using the substance weight ratio as the coating condition.

Also in the present modification, the library databased with the substance weight ratio indicating the amount of agent associated with the condition for the printed matter or the like is used, so that the optimized coating condition can be appropriately determined based on a request from each user for example. When the library indicating the substance weight ratio is used as in the present modification, even when how the medium is coated with the pretreatment agent using the coater 14 in the coating process (the method for the coater 14) or the performance is changed, the coating condition can be more appropriately determined using the same library. More specifically, as described above, as the coater 14, devices of various methods, such as an immersion method, a spray method, a roller method, a dispenser method, an inkjet method, or the like can be used. The amount of the pretreatment agent used for coating the medium in the coating process may vary depending on the method and the performance of the coater 14. Thus, an effect of coating with the pretreatment agent may vary, due to a change in the method and the performance of the coater 14, even when the pretreatment agent of the same composition is used for example.

On the other hand, in the present modification, the library indicating the substance weight ratio is used, whereby the state of the pretreatment agent with which the medium is coated in the coating process can be more appropriately presented for example. In this case, the method and the performance of the coater 14 may be taken into consideration for an operation of determining the pretreatment agent composition based on the substance weight ratio (operation of adjusting the pretreatment agent composition based on the substance weight ratio) for example. With this configuration, the printed matter with the desired quality can be appropriately generated for example.

Also when the substance weight ratio is used as the coating condition as in the present modification, a condition other than the performance of the printed matter can be associated with the substance weight ratio. In this case, a library indicating the matters illustrated in FIG. 8 may be used for example. FIG. 8 illustrates a specific example of information stored in the library used for the operation described above with reference to FIG. 7. The library used in the present modification has features that are the same as or similar to those of the library described above with reference to FIG. 3, except for the points described below. In FIG. 8, 13 types of information are illustrated with at least part of the information stored in the library denoted by numbers 1 to 13 (#1 to 13) to be distinguished from each other, as in FIG. 3. Furthermore, in the illustrated case, each of these types of information is information in which the substance weight ratio, the workability regarding the coating process, the cost of the coating process, and the performance of the printed matter are associated with each other.

In each information, the substance weight ratio indicates the weight (% o.w.f. value) of each substance illustrated in the figure, to be provided to the medium, with respect to the unit weight of the medium. The workability and the cost of the coating process and the performance of the printed matter indicate matters that are the same as or similar to those in the library described with reference to FIG. 3. By using such a library, for example, the substance weight ratio for achieving the condition for the desired printed matter and the like can be appropriately proposed. For example, customization of the cost, the quality, and the like of the printed matter in accordance with a user request and the like can be performed.

Also in this case, information stored in the library can be changed in various ways, as in the case described with reference to FIG. 3. How the information is managed and the like can also be changed in various ways. More specifically, a case is conceivable such as that where a preferable coating condition varies depending on the type and property of the medium used for example. Furthermore, a case is conceivable such as that where depending on the quality of the printed matter required or the like, the substance weight ratio preferably varies based on the type and the property of the medium for example. Furthermore, a case is conceivable such as that where even the media made of the same fibers preferably have different substance weight ratios, depending on a weaving method, thickness, or weight per unit weight of the fibers. In such a case, a case is conceivable such as that where in the library, a parameter indicating the type, property, and the like of the medium is associated with the substance weight ratio. With this configuration, for example, the coating condition can be more appropriately determined in accordance with the medium used. In this case, the type and the property of the medium are taken into consideration, for example, so that the coating condition can be more appropriately determined in response to various requests (requested specification) from the user, under the condition using the same medium.

As the configuration of the printing system 10, a configuration in a case where the pretreatment process (coating process), the print process, and the subsequent treatment process (steaming process, washing process) are executed is mainly described above. Still, according to a modification of the configuration of the printing system 10, a case is conceivable such as that where the printed matter is generated using ink not requiring some of these processes. More specifically, for example, there may be a case such as that where pigment ink requiring no washing process as the subsequent treatment process is used for generating the printed matter. Furthermore, for example, when ink requiring no color development process after the print process is used, there may be a case such as that where no steaming process is performed. Also in these cases, for example, the coating condition can be appropriately determined as described above.

As described above, the controller 12 is communicably connected to the devices in the printing system 10 through a network, and inputs and outputs data, commands, and the like as appropriate. Still, according to a modification of the configuration of the printing system 10, a case is conceivable such as that where a device that executes at least part of the processes is not connected to the printing system 10. Also in such a case, the coating condition can be appropriately determined as described above. In this case, for example, the device condition or the like for the device not connected to the controller 12 may be reflected on the device by a manual operation by the work staff or the like. Also with such a configuration, for example, promotion, demotion, or the like of the performance related to the device can be appropriately adjusted.

As described above, the controller 12 performs proposing of the coating condition using the library or the like. In this case, a configuration is preferable where information can be added as appropriate to the library. In this case, for example, a configuration may be employed that allows new registration of new information regarding a new pretreatment agent composition or the like, changing (customization) of registered information, or the like. More specifically, for example, in cases such as a case where the performance required changes due to the use of a new cloth as the medium and a case where the pretreatment agent is used with an amount or composition different from that in conventional cases, the library can be appropriately and easily updated by adding the information corresponding to the new condition to the library. With this configuration, for example, it is possible to appropriately enrich the information stored in the library. In this case, for example, any user may be allowed to add the information. A result of newly registering and changing the registered information in a library managed by one user may be able to be reflected on a library managed by another user for example. In this case, for example, a case is conceivable such as that where the added or changed information is registered (exported) to a cloud server, to be providable worldwide. The information stored in the library is not limited to the matters described above, and various change or the like may be made. More specifically, a case may be considered such as that where the library stores matters such as those related the input order of substances forming the pretreatment agent composition, expiration date of the pretreatment agent, or the preparation to be performed for generating the pretreatment agent for example. With this configuration, usability of the printing system 10 and the controller 12 can be appropriately improved for example.

Furthermore, a case is conceivable such as that where an artificial intelligence is used for proposing and determining of the coating condition performed by the controller 12 for example. In this case, the controller 12 proposes or determines the coating condition, based on a trained model trained with the performance of the printed matter or the like and the coating condition associated with each other for example. In this case, the trained model may be trained by machine learning for example. Furthermore, as the machine learning, for example, deep learning may be performed. With this configuration, for example, the trained model used for proposing or determining the coating condition can be appropriately generated.

INDUSTRIAL APPLICABILITY

The present invention can be suitably applied to a printing system.

What is claimed is:

1. A printing system configured to generate a product of printing, the printing system comprising:
   a pretreatment machine that is a device configured to execute a pretreatment process of performing a predetermined pretreatment on a medium that is a target of the printing;
   a printing device configured to execute a print process of performing the printing by ejecting ink onto the medium after the pretreatment performed by the pretreatment machine; and
   a process management device configured to propose a condition for the pretreatment process based on a condition for the product to be generated,
   wherein
   the medium is a fabric medium, and
   the pretreatment process is a coating process of coating the medium with a pretreatment agent;
   the process management device is configured to set the condition for the coating process based on a result of estimating a time required for executing the coating process.

2. The printing system as set forth in claim 1, wherein the process management device receives a designation of the condition for the product from a user, and determines the condition for the pretreatment process to be proposed, based on the condition for the product received from the user.

3. The printing system as set forth in claim 2, wherein the process management device receives the designation of the condition for the product from the user by presenting to the user a plurality of parameters for the condition for the product and receiving from the user an instruction to change a value of at least any of the plurality of parameters, and determines the condition for the pretreatment process to be proposed based on the condition for the product received from the user.

4. The printing system as set forth in claim 1, wherein
   the pretreatment process is a process of coating the medium with the pretreatment agent including a plurality of types of substances, and
   the process management device proposes, as at least part of the condition for the pretreatment process, pretreatment agent blending information that is information indicating a composition of the plurality of types of substances included in the pretreatment agent.

5. The printing system as set forth in claim 1, wherein
   the pretreatment process is a process of coating the medium with the pretreatment agent including a plurality of types of substances,
   the process management device determines the condition for the pretreatment process to be proposed, based on condition association information that is information in which the condition for the product and the condition for the pretreatment process are associated with each other, and
   in the condition association information, as the condition for the pretreatment process, a substance weight ratio is used that indicates an amount of each of the plurality of types of substances included in the pretreatment agent to be provided to the medium with respect to a unit weight of the medium.

6. The printing system as set forth in claim 5, wherein based on the substance weight ratio as the condition for the pretreatment process associated with the condition for the product in the condition association information, the process management device proposes a pickup ratio that is a proportion of a weight of the pretreatment agent used for the coating to a weight of the medium, and pretreatment agent blending information that is information indicating a composition of the plurality of types of substances included in the pretreatment agent.

7. The printing system as set forth in claim 5, wherein the process management device receives a designation of a pickup ratio that is a proportion of a weight of the pretreatment agent used for the coating to a weight of the medium from the user, and based on the substance weight ratio as the condition for the pretreatment process associated with the condition for the product in the condition association information and on the pickup ratio, proposes pretreatment agent blending information that is information indicating a composition of the plurality of types of substances included in the pretreatment agent.

8. The printing system as set forth in claim 1, wherein the process management device proposes pretreatment device condition information that is information designating an operation of the pretreatment machine performing the coating using the pretreatment agent, as at least part of the condition for the pretreatment process.

9. The printing system as set forth in claim 1, wherein based on condition association information that is information in which the condition for the product and the condition for the pretreatment process are associated with each other, the process management device determines the condition for the pretreatment processes to be proposed.

10. The printing system as set forth in claim 1 further comprising a subsequent treatment machine configured to execute a subsequent treatment process of performing a predetermined subsequent treatment on the medium after the print process, wherein
    the condition for the product to be generated is a condition indicating a state of the medium after the subsequent treatment process.

11. The printing system as set forth in claim 1, wherein the process management device proposes the condition for the pretreatment process in association with a result of estimating a cost required for executing at least any of the processes executed on the medium.

12. The printing system as set forth in claim 1, wherein
    the process management device proposes a plurality of the conditions for the pretreatment process to the user, and proposes each of the conditions for the pretreatment process, in association with a state of the product achieved when the condition for the pretreatment process is employed.

13. A process management device used in a printing system configured to generate a product of printing, wherein the process management device proposes a condition for a pretreatment process of performing, with a pretreatment machine, a predetermined pretreatment on a medium that is a target of the printing, based on a condition for the product, wherein
    the medium is a fabric medium, and
    the pretreatment process is a coating process of coating the medium with a pretreatment agent;

the process management device is configured to set the condition for the coating process based on a result of estimating a time required for executing the coating process.

14. A printing system configured to generate a product of printing, the printing system comprising:
a pretreatment machine that is a device configured to execute a pretreatment process of performing a pretreatment of coating a fabric medium that is a target of the printing with a pretreatment agent including a plurality of types of substances;
a printing device configured to execute a print process of performing the printing by ejecting ink on the medium after the pretreatment has been executed by the pretreatment machine; and
a process management device configured to manage a condition for the pretreatment process, wherein
the process management device manages the condition for the pretreatment process based on a substance weight ratio indicating an amount of each of the plurality of types of substances included in the pretreatment agent to be provided to the medium with respect to a unit weight of the medium,
wherein
the medium is a fabric medium, and
the pretreatment process is a coating process of coating the medium with a pretreatment agent;
the process management device is configured to set the condition for the coating process based on a result of estimating a time required for executing the coating process.

* * * * *